Patented Oct. 26, 1954

2,692,874

UNITED STATES PATENT OFFICE 2,692,874

ELASTOMERS FROM POLYALKYLENE ETHER GLYCOL REACTED WITH ARYLENE DIISOCYANATE AND WATER

Esley O. Langerak, Newport, Del., assignor to E. I. du Pont de Nemours and Company, Wilmington, Del., a corporation of Delaware No Drawing. Application May 17, 1952, Serial No. 288,532

10 Claims. (Cl. 260—77.5)

This invention relates to an improved process for the preparation of elastomeric condensation products from the reaction between polyalkylene ether glycols, arylene diisocyanates and water.

It is well known that diisocyanates may be reacted with dihydroxy compounds to form condensation products or copolymers. In Hill U. S. application Serial No. 237,660, filed July 19, 1951, now abandoned, there is described the formation of tough rubbery products by the reaction between polyalkylene ether glycols and arylene diisocyanates in the presence of moisture. It is known that in many cases the reactions of isocyanates with hydroxyl groups are catalyzed by tertiary amines such as pyridine, gamma-picoline, dimethylcyclohexylamine, and the like. When such tertiary amines are added during the reaction of neutral polyalkylene ether glycols and arylene diisocyanates, however, the expected catalytic effect is not observed and instead of obtaining an improved elastomer, a gelatinous condensation product is formed which yields upon curing a soft weak non-homogeneous product having no mechanical strength.

It is an object of the present invention to provide a process for the formation of improved elastomers of high tensile strength, excellent elasticity, low brittle point and desirable modulus of elasticity from the reaction between polyalkylene ether glycols, arylene diisocyanates and water. A further object is to provide a process in which the reaction proceeds rapidly and uniformly to yield the ultimate elastomer. Further objects will appear from the description of this invention which follows:

According to the present invention, it has been found that improved results are obtained when the reaction between the polyalkylene ether glycol, arylene diisocyanate and water is carried out under acid conditions and in the presence of a small amount of an acid salt of a tertiary organic base from the class consisting of tertiary nitrogen and tertiary phosphorus bases.

In a preferred embodiment of this process, elastomers are prepared by heating together (a) a polyalkylene ether glycol having a molecular weight between 750 and 10,000, (b) from 2 to 12 moles of arylene diisocyanate per mole of glycol, (c) from 0.5 to 1.5 moles of water per mole of arylene diisocyanate, (d) an acid salt of a tertiary organic base selected from the class consisting of tertiary nitrogen and tertiary phosphorus bases, the amount of the said salt being such that the amount of tertiary base present is from 0.04 to 1% by weight of the total weight of reactants, and (e) enough of an acid-reacting substance to give the composition as a whole an acid reaction.

It is sometimes desirable to conduct the reaction in two steps, during the first of which the polyalkylene ether glycol and the arylene diisocyanate are heated together to form an intermediate polymer. In the second step, the acid salt of the tertiary amine or tertiary phosphine, water, and enough of an acid-reacting substance to give the composition as a whole an acid reaction are incorporated in the polymer, which is thereafter cured to produce the final elastomer.

The process of this invention is illustrated by the following examples, in which parts are by weight.

Example 1

Fifty-eight (58) parts of a polyethylene ether glycol having an average molecular weight of 1540 and 27.8 parts of tolylene-2,4-diisocyanate are put in a Werner-Pfleiderer mill and milled for 2 hours at 70–75° C. There is then added 0.237 part of pyridine. The acidity of the polyethylene ether glycol is such that the addition of this amount of pyridine leaves the reaction mass slightly acid. After 30 minutes' milling, 2 parts of water are added and milling is continued for 1 hour. An additional 2 parts of water are added. At the end of 15 minutes the mass is in the form of rubbery crumbs and is discharged from the mill.

A portion of the crumbs is put into a hydraulic press and cured at 150° C. for 1 hour at 2,800 lbs. per square inch pressure. A clear, transparent, light amber colored, rubbery slab results. It has the following properties:

Tensile strength, 1225 lbs. per sq. in.
Elongation at the break, 460%
Modulus at 300% elongation, 1100 lbs. per sq. in.
Brittle point, −62° C.
Tear resistance, excellent When the preparation is repeated without the addition of pyridine, a non-homogeneous product is obtained which has virtually no tear resistance and such low tensile strength that it can be broken by hand.

Example 2

One hundred (100) parts of a polyethylene ether glycol having an average molecular weight of 1000 are stirred in a glass vessel with 52.2 parts of tolylene-2,4-diisocyanate and 0.23 part of benzenesulfonyl chloride at 100° C. for 1 hour. The resultant prepolymer is a viscous transparent liquid with an amber color.

The prepolymer is transferred to a Werner-Pfleiderer mill which has been preheated to 75° C. and milling is started. Then 0.073 part of triethylamine is added and 6.6 parts of water are added over a period of 5 minutes. Milling is continued at 75° C. for 45 minutes when the product is a mass of rubbery crumbs.

A portion of the mass is cured in a press at 135° C. after 1 hour at 2,800 lbs. per sq. in. pressure. The resultant elastomer is in the form of a clear transparent yellow slab with the following properties:

Tensile strength, 2500 lbs. per sq. in.
Elongation at the break, 620%
Modulus at 300% elongation, 750 lbs. per sq. in.
Brittle point, −54° C.
Yerzley resilience, 62%

Example 3

One hundred (100) parts of a polyethylene ether glycol of average molecular weight 1000 (a 5% solution in water shows a pH of 4.4) are stirred in a glass vessel with 17.4 parts of tolylene-2,4-diisocyanate and 0.073 part of triethylamine for 1 hour at 100° C. This mass is acid to moist indicator paper. At the end of 1 hour the product is a viscous liquid, which is more viscous than that of Example 2 thus indicating a higher molecular weight. There are then added an additional 34.8 parts of tolylene-2,4-diisocyanate and the mixture is stirred 5 minutes. There is no decrease in viscosity. Another 0.073 part of triethylamine is added, the mixture is stirred momentarily and is then transferred to a Werner-Pfleiderer mill preheated to 75° C. Water (3.3 parts) is added immediately and milling carried on for 30 minutes at 75° C. Then an additional 3.3 parts of water are added. After 15 minutes further milling, the product is a mass of rubbery crumbs. A portion is cured in a press for one-half hour at 135° C. and 2,800 lbs. per sq. in. pressure. It is a light yellow transparent slab which has a tensile strength of 1440 lbs. per sq. in.

Example 4

Sixty (60) parts of a polyethylene ether glycol of average molecular weight of 1000 are stirred in a glass vessel with 31.3 parts of tolylene-2,4-diisocyanate and 0.12 part of benzoyl chloride. The temperature is held at 100° C. for 1 hour. The resulting viscous liquid is transferred to a Werner-Pfleiderer mill which has been preheated to 75° C. There is then added 0.47 part of tri-n-butylphosphine and milling is continued for 30 minutes. Then 2.0 parts of water are added, milling is continued at 75° C. for 1 hour, an additional 2.0 parts of water are added, and milling is continued for 20 minutes. The product is in the form of rubbery crumbs.

A portion is cured in a press at 135° C. for 1 hour at 2,800 lbs. per sq. in. pressure. The transparent amber slab has the following properties:

Tensile strength, 1800 lbs. per sq. in.
Elongation at the break, 480%
Modulus at 300% elongation, 900 lbs. per sq. in.
Brittle point, −43° C.

Example 5

One hundred (100) parts of a polypropylene ether glycol of an average molecular weight of 1025 are stirred in a glass vessel at 100° C. for 1 hour with 52.2 parts of tolylene-2,4-diisocyanate and 0.19 part of phosphorus trichloride. The resulting thick liquid is transferred to a Werner-Pfleiderer mill previously heated to 75° C. The mill is started and there are added 0.637 part of pyridine and 4.0 parts of water. After milling at 75° C. for 30 minutes, an additional 2.6 parts of water are added. A further milling for 40 minutes produces a rubbery crumbly mass.

A portion is cured in a press for 20 minutes at 135° C. and 2,800 lbs. per sq. in. pressure. The resulting transparent slab has the following properties:

Tensile strength, 4150 lbs. per sq. in.
Elongation at the break, 380%
Modulus at 300% elongation, 2225 lbs. per sq. in.
Brittle point, −42° C.

Example 6

Twenty (20) parts of a polyethylene ether glycol of average molecular weight 4000 and containing approximately 0.5% water are stirred in a glass vessel with 26.4 parts of benzene, 10 parts of tolylene-2,4-diisocyanate and 0.24 part of pyridine to form a homogeneous solution. The acidity of the polyethylene ether glycol is such that the addition of pyridine does not raise the pH of a 5% solution in water above 6. The solution is held at 60° C. for 5 hours. A portion is then poured out onto a glass plate and allowed to stand at room temperature for the benzene to evaporate and for curing to take place. At the end of 2 days, a colorless transparent film has formed which is peeled off the glass plate. It is elastic and has good tensile and tear strength. It is suitable for use as a wrapping film or other protective covering. It is quite resistant to hydrocarbon solvents.

When dimethylphenylphosphine is substituted for the pyridine in the above example, similar results are obtained.

Example 7

Thirty (30) parts of a polyethylene ether glycol of average molecular weight of 4000 containing approximately 0.5% water are stirred with 6 parts of tolylene-2,4-diisocyanate, 31.7 parts of benzene and 0.24 part of pyridine to form a homogeneous solution. The acidity of the polyethylene ether glycol is such that the addition of pyridine doesn't raise the pH of a 5% aqueous solution of the mixture above 6. It is then held at 60° C. for 4 hours. A portion is poured onto a glass plate and let stand at room temperature for 2 days. A colorless transparent film is formed which is tough and has good tear strength. When a narrow strip is cut from this film and pulled beyond its elastic limit it is found to cold draw to give an elastic product of very high tensile strength. It is suitable for use as an elastic fiber.

Example 8

Into a Werner-Pfleiderer mixer preheated to 100° C. are placed 99 parts of n-butylene ether glycol of an average molecular weight of 10,000. After the glycol is melted, 26.1 parts of tolylene-2,4-diisocyanate and 0.38 part of phosphorus trichloride are added. This amount of phosphorus trichloride is required because a 5% aqueous slurry of the glycol shows a pH of 9.3. After the addition, the reaction mass shows a pH of 4 on general purpose indicator paper. The mass is then milled 1 hour at 100° C. A clear yellow viscous liquid results. A total of 1.2 parts of pyridine and 3.0 parts of water is then added with continued milling in three equal increments at intervals of 20 minutes. The temperature is held at 100° C. during this time. At the end of 30 minutes after the last addition the product is in the form of white doughy chunks. The mass is then worked on a rubber mill at 30° C. to a smooth homogeneous white band.

A portion is cured in a mold at 140° C. under 2800 lbs. per sq. in. pressure for 1 hour. An opaque, cream-colored slab is obtained. It is tough and rubbery and has a tensile strength at the break of 4800 lbs. per sq. in.

*Example 9*

Thirty-three (33) parts of a polyalkylene ether glycol of the general formula $HO(C_2H_4OCH_2O)_nH$ with an average molecular weight of 1650 are thoroughly mixed with 13.9 parts of tolylene-2,4-diisocyanate and 0.05 part of benzene sulfonyl chloride and heated at 100–110° C. for 1 hour in a closed container. The mixture is then cooled to 90° C. and 0.3 part of pyridine and 1.4 parts of water are added and thoroughly mixed in. The resultant viscous mass is poured into a pan and baked in an oven at 80° C. for 30 minutes. The somewhat tacky solid mass is then milled on a cold rubber mill to form a smooth homogeneous band. A portion is cured by heating in a mold at 130° C. for 30 minutes under a pressure of 7000 lbs. per square inch. A soft, elastic and transparent slab is obtained.

The tertiary organic bases which are useful, in the form of their acid salts, in the practice of this invention consist of the tertiary nitrogen bases and the tertiary phosphine bases, i. e., tertiary amines and tertiary phosphines. They include tributylamine, triethylamine, diethylcyclohexylamine, dimethylbenzylamine, tripropylamine, dimethylaniline, pyridine, gamma-picoline, tri-n-butylphosphine, dimethylphenylphosphine, and other similar compounds. The acid salt used may be the hydrochloride, the sulfate, the nitrate or the salt of a carboxylic acid such as the acetate or benzoate. The chemical identity of the acid part of the salt has no apparent effect on the reaction and so far as is known the salt of any acid is operative. The acid salt of the tertiary base may be added as such to the reaction mixture or it may be formed in situ by adding the free base to the reaction mass which contains sufficient acid-reacting material to form the salt.

The amount of tertiary base salt to be used appears to depend on the strength of the base and on the acidity of the reaction mass. For a given base, the reaction becomes faster as the amount of base increases, up to about a 1% addition, based on the total weight of the reaction mixture. The use of as little as 0.04% shows a distinctly observable beneficial effect.

The term "polyalkylene ether glycols" as used throughout the specification and claims refers to polyethers which are derived from alkylene oxides or glycols or from other heterocyclic ethers such as dioxolane, and which may be represented by the formula $HO(RO)_nH$, in which R stands for an alkylene radical and $n$ is an integer greater than 1. Not all the alkylene radicals present need be the same. Glycols containing a mixture of radicals, as in the compound

$HO(CH_2OC_2H_4O)_nH$ can be used. These glycols are either viscous liquids or waxy solids. The molecular weights of the glycols which are most useful in the process of this invention are at least 750 and may be as high as 10,000. The preferred glycols are the polyethylene ether glycols, the polypropylene ether glycols and the polybutylene ether glycols.

Any of a wide variety of arylene diisocyanates may be employed in this process. Representative compounds include tolylene-2,4-diisocyanate, meta-phenylene diisocyanate, 1-chlorophenylene-2,4-diisocyanate, and naphthalene-1,5-diisocyanate. These compounds may contain other substituents on the aryl rings and the isocyanate groups may be attached to the same or to different rings.

The molar ratio of arylene diisocyanate to polyalkylene ether glycol is preferably between 2:1 and 12:1, although mixtures in other proportions may be used. When using a polyalkylene ether glycol of relatively low molecular weight, e. g., from 750 to about 3000, the molar ratio of diisocyanate to glycol is preferably between 2:1 and 7:1. With higher molecular weight glycols, a higher ratio of diisocyanate to glycol is desirable. Thus for a glycol of molecular weight 6000 the preferred ratio is from 8:1 to 12:1, while for a glycol of molecular weight 1000, the preferred molar ratio is about 3:1.

It is necessary that at least the latter stages of the reaction be conducted in the presence of water, preferably present in amount from 0.5 to 1.5 moles per mole of arylene diisocyanate. The other components of the reaction mixture sometimes contain various amounts of water, and in this case it is necessary to add only whatever extra water may be needed to bring the total up to the desired amount. If greater amounts of water are present, the excess acts as a plasticizer for the rubbery product. With smaller amounts, the reaction proceeds more slowly and does not always go to completion or results in a product not having the desired physical properties.

It is essential that the condensation be carried out under acid conditions, that is, that the reaction mixture as a whole should possess an acid reaction. Unless the glycol or the diisocyanate already contain sufficient acidity, an acid-reacting compound is added to the mixture. This compound may be an acid chloride, an acid bromide, an acid iodide, i. e., an acid halide in which the halogen has an atomic weight between 35 and 127, or an inorganic acid. When an acid halide is used, it may be derived from either an organic or an inorganic acid. Representative and useful members of this class of compounds are hydrogen chloride, hydrogen bromide, hydrogen iodide, sulfuric acid, nitric acid, phosphoric acid, acetyl chloride, acetyl bromide, benzenesulfonyl chloride, sulfurous oxybromide, sulfurous oxychloride, phosphorus tribromide, phosphorus trichloride, phosphorus pentachloride, phosphorus oxychloride, phosphorus oxybromide, and benzoyl chloride. Simple organic halides such as benzyl chloride are not operable. Acid fluorides are in general too volatile to be useful in this process. Free carboxylic acids such as acetic, benzoic, etc. cannot be used as they react with the isocyanate with liberation of carbon dioxide.

Some benefit is obtained from the use of less than about 0.1% of the acid-reacting substance, based on the weight of the isocyanate, but the results are less satisfactory than if higher amounts are employed. When more than 0.5% of the acid-reacting substance is used, the physical properties such as tensile strength and abrasion resistance of the resulting elastomers tend to be somewhat impaired. If a component of the reaction mixture contains appreciable amounts of alkaline materials, it is of course necessary to employ increased amounts of acid-reacting substances to neutralize this alkalinity. As the glycol is more apt to be alkaline than is the diisocyanate, it is well to add enough of the acid-reacting substance that a 5% dispersion or solution of a mixture of it with the glycol shows a pH of less than 7.0 and preferably 6.0 or less.

The acid-reacting substance may be added at the time of mixing the glycol and diisocyanate, may be incorporated with either or both of the primary reactants prior to mixing, or may be added after mixing has taken place but prior to or at the same time as the addition of water and the tertiary base salt.

Although the mechanism of the reaction is not fully understood, it is believed that an initial copolymerization takes place between the glycol and the diisocyanate to form a linear intermediate polymer containing urethane linkages and having isocyanate groups at the end of the chains. Thereafter this intermediate polymer may react further with water and additional diisocyanate or with substituted ureas which are formed by reaction between the water and the diisocyanate. In this way the linear polymers are cross-linked and extended in length to form the ultimate elastomeric products. The acid salt of the organic tertiary base is believed to catalyze the second or condensation portion of the reaction.

The reaction may conveniently be carried out in two distinct steps, corresponding to this theoretical mechanism. During the first step, the "prepolymer" is formed in the substantial absence of water, and during the second step water and the tertiary organic base salt are added and cross-linking takes place to form the final elastomer. Unless enough acid-reacting substance is already present, the acidity of the mixture is adjusted prior to the second step so as to insure that the mixture has an acid reaction during the condensation. During the prepolymerization step, the reaction mixture is liquid and is easily agitated, whereas during the condensation step more strenuous agitation is required. The two-step reaction consequently permits more efficient utilization of the mixing equipment since each step can be performed in equipment which is best adapted for the particular operation. This procedure is particularly desirable when massive elastomeric products are to be produced.

In an alternative method, the various components are all present initially, together with a solvent such as benzene, and the condensation takes place in the solvent. The resulting solution may be spread out in a thin layer which, upon the evaporation of the solvent, forms a film of excellent elasticity.

As the reaction is carried out in the liquid phase, the temperature should be above the melting point of the glycol. Generally, temperatures of 50° to 100° C. are satisfactory. From one to two hours reaction time is ordinarily adequate to complete the prepolymerization step, and a somewhat shorter time for the condensation step. The only detrimental effect of using longer reaction times which has been observed is a gradual darkening of the coloring of the product.

The curing temperatures and pressures used in making the elastomers are not critical. In general, longer curing times are required at lower temperatures and pressures. Thus, the curing time may vary from 2 to 4 days at room temperature and atmospheric pressure for elastomeric films to 15 to 20 minutes at 125–150° C. at 1,000 to 3,000 lbs. per square inch for molded products. The temperatures and pressures used in ordinary rubber processing equipment are satisfactory for use in curing the elastomers of this invention.

The condensation product, before curing, is usually a mass of rubbery crumbs which can be sheeted on a rubber mill and readily handled in a press. The cured product is an elastomer and can be used wherever producs with elastomeric properties are needed. Molded articles can be made of these condensation products. The elastomers are resistant to solvents, particularly hydrocarbon solvents. Having a low brittle point, they are particularly useful for fabricating articles to be used where there is exposure to low temperatures.

The use of tertiary organic base salts according to the present invention permits the desired reaction to take place rapidly and inhibits interfering side reactions which lead to inferior products. In the absence of the tertiary base salt more water must be used to force the reaction to completion. This results in a plasticized product which is softer and has reduced elastic properties. It has low tear strength and low tensile strength.

The process of this invention also makes it possible to prepare films of the condensation product which cure without heating and which may serve as coatings or as wrapping films.

What is claimed is:

1. In a process for the preparation of elastomeric condensation products by the reaction of a polyalkylene ether glycol having a molecular weight between 750 and 10,000 with an arylene diisocyanate in the presence of a small amount of water and under acid conditions, the improvement which comprises carrying out the condensation in the presence of from 0.04 to 1% by weight, based on the weight of the entire reaction mixture, of a tertiary organic base from the class consisting of tertiary nitrogen and tertiary phosphorous bases, said base being present in the form of an acid salt.

2. In a process for the preparation of elastomeric condensation products by the reaction of a polyalkylene ether glycol having a molecular weight between 750 and 10,000 with an arylene diisocyanate in the presence of a small amount of water and under acid conditions, the improvement which comprises carrying out the condensation in the presence of from 0.04 to 1% by weight, based on the weight of the entire reaction mixture, of pyridine present in the form of an acid salt.

3. A process of preparing an elastomeric condensation product which comprises heating together (a) a polyalkylene ether glycol having a molecular weight between 750 and 10,000, (b) from 2 to 12 moles of arylene diisocyanate per mole of glycol, (c) from 0.5 to 1.5 moles of water per mole of arylene diisocyanate, (d) an acid salt of a tertiary organic base selected from the class consisting of tertiary nitrogen and tertiary phosphorus bases, the amount of the said salt being such that the amount of tertiary base present is from 0.04 to 1% by weight of the entire composition, and (e) enough of an acid-reacting substance from the group consisting of acid halides in which the halogen has an atomic weight between 35 and 127 and inorganic acids to give the composition as a whole an acid reaction.

4. A process according to claim 3 in which the polyalkylene ether glycol is a polyethylene ether glycol.

5. A process according to claim 3 in which the polyalkylene ether glycol is a polybutylene ether glycol.

6. A process according to claim 3 in which the arylene diisocyanate is tolylene-2,4-diisocyanate.

7. A process according to claim 3 in which the tertiary organic base is pyridine.

8. A process of preparing an elastomer which comprises heating together (a) a polybutylene ether glycol having a molecular weight between 750 and 10,000, (b) from 2 to 12 moles of tolylene-2,4-diisocyanate per mole of glycol, (c) from 0.5 to 1.5 moles of water per mole of diisocyanate, (d) from 0.04 to 1% by weight, based on the weight of the entire composition, of pyridine in the form of an acid salt, and (e) enough of an acid-reacting substance from the group consisting of acid halides in which the halogen has an atomic weight between 35 and 127 and inorganic acids to give the composition as a whole an acid reaction.

9. A process of preparing an elastomeric condensation product which comprises (1) heating together a polyalkylene ether glycol having a molecular weight between 750 and 10,000 and an arylene diisocyanate to form an intermediate polymer, the molar ratio of diisocyanate to glycol being between 2:1 and 12:1; (2) incorporating into the polymer (a) from 0.5 to 1.5 moles of water per mole of arylene diisocyanate initially present, (b) an acid salt of a tertiary organic base from the class consisting of tertiary nitrogen and tertiary phosphorus bases, the amount of such salt being such that the amount of tertiary base present is from 0.04 to 1% by weight of the entire composition, and (c) enough of an acid-reacting substance from the group consisting of acid halides in which the halogen has an atomic weight between 35 and 127 and inorganic acids to give the composition as a whole an acid reaction; and (3) thereafter curing the composition to produce an elastomer.

10. A process according to claim 9 in which the acid salt of the tertiary organic base is formed in situ by the reaction between the tertiary organic base and the acid-reacting substance.

References Cited in the file of this patent

UNITED STATES PATENTS

| Number | Name | Date |
|---|---|---|
| 2,531,392 | Breslow | Nov. 28, 1950 |

OTHER REFERENCES

Bayer, P. B. Report 45,246, January 31, 1947, pp. 1–6.

Meyerick et al., Transactions Institute of Rubber Industry, October 1949, p. 150.

Bayer et al., Rubber Chem. and Tech., October–December 1950, pp. 812–835.